Sept. 29, 1931.  E. A. ROCKWELL  1,825,160
PRESSURE INDICATING TIRE VALVE
Filed March 3, 1924   3 Sheets-Sheet 2
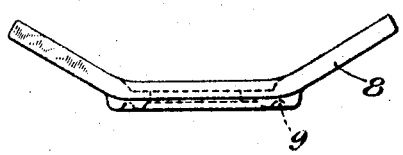
Fig. 7.
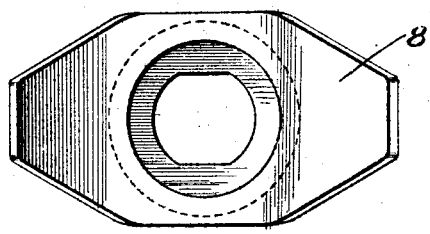
Fig. 8.
Fig. 9.
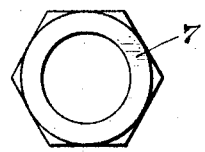
Fig. 12.
Fig. 10.
Fig. 11.
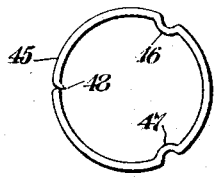
Inventor
Edward A. Rockwell,
By his Attorneys
Prindle, Wright, Nue LeBeau Sept. 29, 1931.  E. A. ROCKWELL  1,825,160
PRESSURE INDICATING TIRE VALVE
Filed March 3, 1924   3 Sheets-Sheet 3
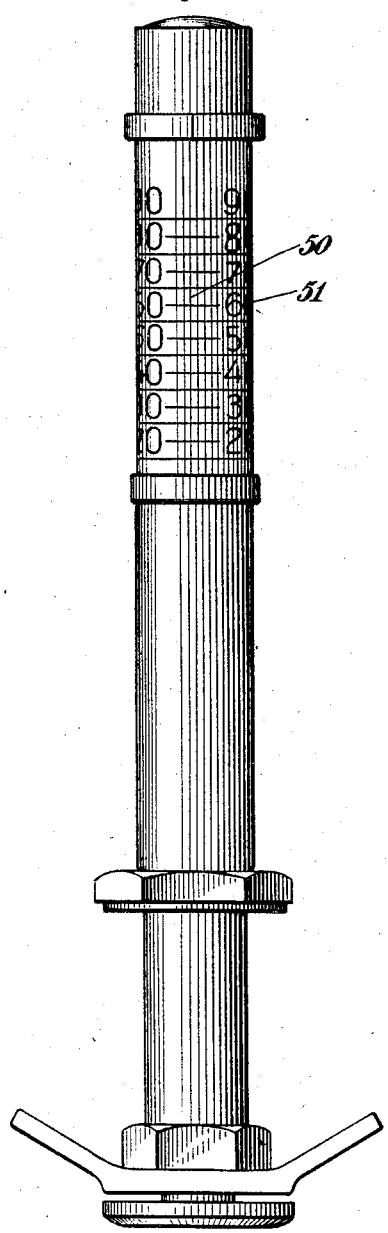
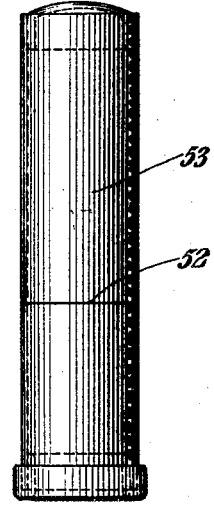
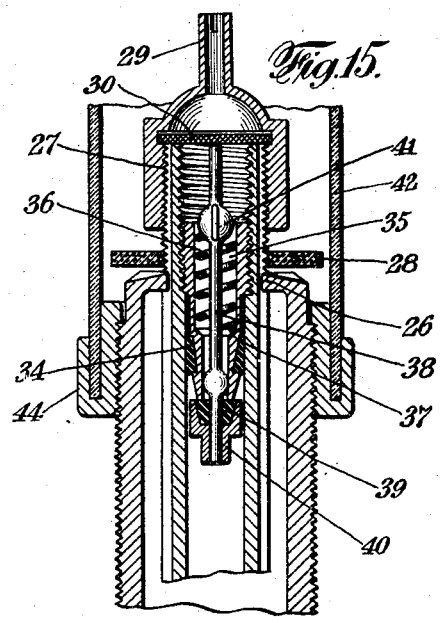

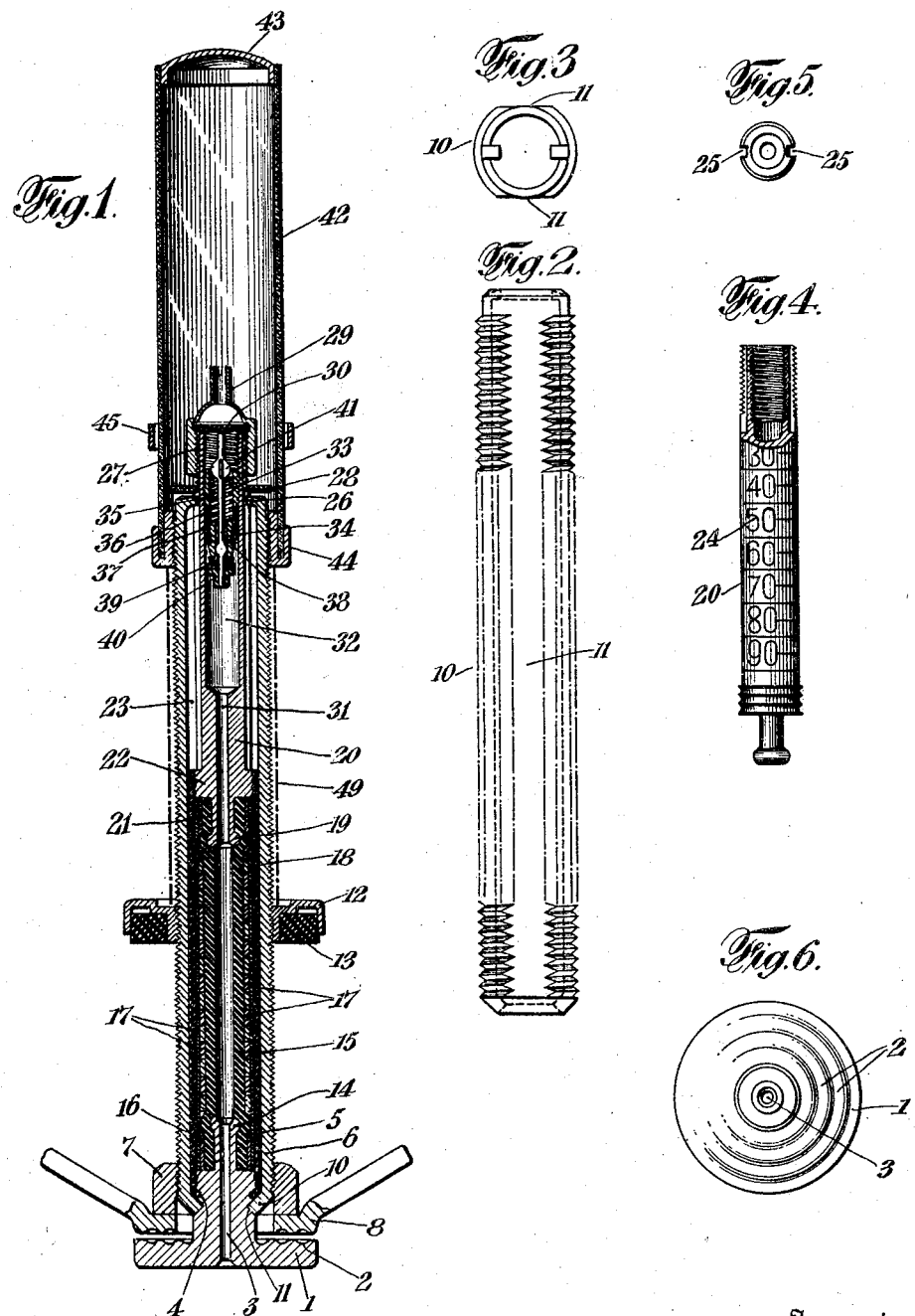

Patented Sept. 29, 1931

1,825,160

UNITED STATES PATENT OFFICE

EDWARD A. ROCKWELL, OF NEW YORK, N. Y.

PRESSURE INDICATING TIRE VALVE

Application filed March 3, 1924. Serial No. 696,494.

My invention relates particularly to an improved form of tire valve whereby the pressure of the air within the tire is accurately and effectively indicated. The said valve has application to any type of apparatus in which it is desired to indicate the air pressure but it is especially applicable for use on automobiles.

The object of my invention is to provide a tire valve by means of which the air pressure within the tire or any other inflatable container of air, will be accurately and effectively registered, and the construction in which is such that the device is compact, cheap to manufacture and readily readable. Further objects of my invention will appear from the detailed description of the same hereinafter.

While my invention is capable of embodiment in many different forms for the purpose of illustration I have shown only certain forms of the same in the accompanying drawings in which—

Figure 1 is a vertical section of one form of tire valve made in accordance with my invention, Figure 2 is a side elevation of the body portion thereof, Figure 3 is a plan view of the same, Figure 4 is a side elevation of the tube therein carrying the indicating scale in one form of my invention, Figure 5 is a plan view of the same, Figure 6 is a plan view of the lower clamping member adapted to be secured to the body portion of the tire valve, Figure 7 is a side elevation of the upper clamping member cooperating therewith, Figure 8 is a plan view of the same, Figure 9 is a plan view of the nut which cooperates with the said clamping members, Figure 10 is a side elevation of a ferrule used in the tire valve, Figure 11 is a plan view of an indicating ring on the transparent part of the tire valve, Figure 12 is a side elevation of a sleeve to separate the spring from the other extensible portions of the tire valve, Figure 13 is a side elevation of a modified form of my invention, Figure 14 is a side elevation of another slightly modified form of the same, and Figure 15 is a vertical section enlarged of the portion of the apparatus showing the valve stem and immediately adjacent parts enlarged.

In the drawings I have shown a tire valve having a lower clamping member 1 provided with an upper corrugated surface 2 to contact with the interior of the tire, said clamping member 1 being provided with a longitudinal passageway 3 to permit the entry of air to the tire. The upper portion of the clamping member has an annular recess 4 to receive the lower end of a spring 5 into which it is clamped by the lower spun portion of a screw-treaded body portion 6 in the form of a tube. This body portion 6 is preferably made up from sheet metal in the form of a tube by forming a longitudinal seam formed in the said body portion. On the screw-threaded outer portion of the tube 6 there is a nut 7 which is adapted to force downwardly an upper clamping member 8 having a lower corrugated surface 9 to be clamped against the outer surface of the tire. It will be noted that the sides of the body portion 6 have flattened portions 10 to cooperate with a flattened opening 11 in the clamping portion 8. Furthermore, above the nut 7 there is a further nut 12 having a gasket 13 to be clamped down against the adjacent portion of the rim on which the tire is carried. Furthermore, the uppermost portion of the lower clamping member 1 has a nipple 14 to receive a rubber tube 15, the same being held thereon by a ring 16. Around the rubber tube 15 a number of flat rings 17 are positioned to prevent the lateral expansion of the tube 15 to any appreciable degree and yet permitting the longitudinal extension of said rubber tube. Each of these rings 17 not only supports the rubber tube 15 in any given line extending around the same, but also, because of the flat surface thereof, longitudinally of the tube in lines which cross said line extending around the tube. Again, outside the rings 17 and inside the spring 5 there is provided a sleeve 18 to prevent any friction between the rings 17 and the spring 5. The upper end of the rubber tube 15 is located over a nipple 19 on an inner tube 20 where it is held by means of a ferrule 21. It will be noted that the inner tube 20 has an annular flange 22 which is considerably larger in diameter than the nipple 19 and the rings 17 so as to provide space for the sleeve 18 and for the further purpose of providing an annular space 23 adjacent to the outer surface of the inner tube 20 so as to prevent a printed scale 24 thereon being marred and destroyed as, for example, when the scale is made by applying an enamel thereto, which may be in as many colors as found desirable as an effective indicating means showing the pressure of the air within the tire. The exterior of the inner tube 20 has, furthermore, two longitudinal grooves 25 to receive corresponding projections 26 on the body portion 6 and thus prevent any relative rotation between the inner tube 20 and the body portion 6. Upon its upper end the inner tube 20 has a short screw-thread 27 carrying a colored marker 28, preferably of celluloid, and arranged to be screwed down to the lower limit of the screw-thread. The upper end of the tube 20 has the usual air cap 29 which is screwed on the same and which carries a rubber gasket 30 therein.

The tube 20 has, furthermore, upon the interior, a longitudinal passage-way 31, the upper portion of which has an enlargement 32 to receive any desired type of valve mechanism for retaining the air within the tire. This may be comprised of a valve casing 33 screw-threaded in the interior of the enlargement 32 and provided on its exterior with a rubber gasket 34 which will prevent the escape of the air around the outside of the same. Furthermore, the valve casing 33 has a longitudinal passage-way 35 in which there is carried a spring 36 cooperating at its lower end with an abutment 37 and located around a valve stem 38 having a washer 39 secured to its lower end by means of a sleeve 40 so as to cooperate with the lowermost end of the valve casing 33. The upper end of the valve stem 38 has an enlargement 41 to contact with the upper end of the spring 36.

Around the exterior of the body portion 6 there is a transparent cover 42 made of celluloid or any other desired material, having a cap 43 secured thereto and fixedly supported at its lower end in a metal screw-threaded recessed sleeve 44 screw-threaded to the outside of the body portion 6. Furthermore, upon the outside of the transparent cover 42 there is a longitudinally movable split ring 45 arranged to have three points of contact with the cover, two of which are in the form of curved indentations 46 and 47 and the third of which is in the form of a sharp point 48 so that the sharp point 48 will be carried in a slight vertical groove in the outside of the transparent cover 42 and thus will not, by its adjustment, mar the internal surface of the cover. Furthermore, if desired, there may be a sleeve 49 placed over the external screw-thread of the body portion 6 to prevent the access of mud and dirt to the same.

If desired, a slightly modified form of my invention may be made as shown in Figure 13 by constructing it the same except that in this instance there may be provided a transparent cover 50 carrying thereon either exteriorly or interiorly, a scale 51, the indicating of the pressure being shown in this instance by the position of the colored ring 28 with regard to the said scale. It will be understood, also, that, if desired, this scale on the said transparent cover 50 may be utilized together with a scale such as the scale 24 on the inner tube 20.

In Figure 14 I have shown again, a slightly modified form of my invention which is constructed the same as the form shown in Figure 13 except that in this instance there is merely provided a circular line 52 going around the outside of a transparent cover 53 so as to thus make a very inexpensive form of construction. It will be noted, also, that this line may be used together with a scale such as scale 24 on the inner tube 20.

In the operation of my invention, referring first to Figures 1 to 12, it will be understood that the transparent cover 42, having been removed and the cap 29 having been removed, the tire will be inflated in the usual way from any source of air pressure. As the air pressure increases within the tire the colored ring 28 carried upon the upper end of the inner tube 20, will rise due to the longitudinal extension of the rubber tube 15. The movement of the ring 28 in this way will very accurately correspond to the pressure of the air within the tire as, owing to the presence of the rings 17 there will be no transverse expansion of the rubber tube 15 and there will be no friction between the rubber tube 15 and the sleeve 18. Furthermore, by making the rubber tube 15 comparatively thin the longitudinal extension of the rubber tube will be accurate, thus permitting the use of a transparent cover 42 of only moderate length. When the tire has now been inflated to the desired degree this will be indicated by reading the scale 24 as it extends beyond the end of the body portion 6. The air cap 29 is now replaced and the transparent cover 42 is also screwed into place. In the driving of the car, should the air leak out of the tire, this may be readily seen by comparing the relative positions of the colored ring 28 and the outer ring 45 on the transparent cover 42 so that when the ring 28 has a position below the ring 45 it will be known that it is necessary to again inflate the tire. Furthermore, as will be readily seen, the extent of the air pressure wthin th tire may be readily observed in this way, both when inflating the tire and there-after, during the operation of the car, by merely looking at the indicating devices through the transparent cover 42.

In the form of my invention as shown in Figure 13 the operation is the same except that in this instance there are much larger numbers provided on the scale 51 which may be more readily read after the cap 50 has been screwed into place during the operation of the car.

Again, in the operation of the device as shown in Figure 14, the indication will be similar to that as shown in Figure 13 except that in this instance instead of the scale 51 and the indicating ring carried on the outside of the transparent cover, there is merely a circular line 52, and the cooperation of the colored ring with which will show the degree of pressure within the tire.

While I have described my invention above in detail I wish it to be understood that many changes may be made therein without departing from the spirit of the same.

I claim:

1. A pressure gauge comprising an extensible tube, means to prevent transverse expansion thereof, a coil spring located outside the same and an anti-binding means located between the spring and said means.

2. An air pressure indicating gauge adapted to register the actual pressure to which it is subjected comprising an extensible tube open at one end and having an indicating means secured to the other end, and means to prevent transverse expansion thereof comprising a series of flat rings with adjacent right-angle tube-supporting edges around the said tube.

3. A pressure gauge comprising an extensible tube, means to prevent transverse expansion thereof comprising a series of flat rings with adjacent right-angle tube-supporting edges around the said tube and a coil spring located outside the same.

In testimony that I claim the foregoing, I have hereunto set my hand this 14th day of January, 1924.

EDWARD A. ROCKWELL.